US012646163B1

(12) United States Patent
Do et al.

(10) Patent No.: US 12,646,163 B1
(45) Date of Patent: Jun. 2, 2026

(54) SELF-LEARNING AI INSPECTION PLATFORM FOR ANOMALOUS OBJECT DETECTION

(71) Applicant: Elementary Robotics, Inc., South Pasadena, CA (US)

(72) Inventors: Dat Do, Los Angeles, CA (US); Srivatsav Nambi, Phoenix, AZ (US); Eduardo Rafael Mancera, South Pasadena, CA (US); Tania Pérez Salazar, Querétaro (MX); Petr Lipay, Glendale, CA (US); Kyle Bebak, Los Angeles, CA (US); John Thomas Gauthier, Los Angeles, CA (US); Arye Barnehama, Westport, CT (US)

(73) Assignee: Elementary Robotics, Inc., South Pasadena, CA (US)

( * ) Notice: Subject to any disclaimer, the term of this patent is extended or adjusted under 35 U.S.C. 154(b) by 0 days.

(21) Appl. No.: 19/417,203

(22) Filed: Dec. 11, 2025

(51) Int. Cl.
| | |
|---|---|
| *G06T 7/00* | (2017.01) |
| *G06N 3/0464* | (2023.01) |
| *G06N 3/08* | (2023.01) |
| *G06T 7/11* | (2017.01) |
| *G06V 10/764* | (2022.01) |
| *G06V 10/77* | (2022.01) |

(52) U.S. Cl.
CPC ......... *G06T 7/0008* (2013.01); *G06N 3/0464* (2023.01); *G06N 3/08* (2013.01); *G06T 7/11* (2017.01); *G06V 10/764* (2022.01); *G06V 10/7715* (2022.01); *G06T 2207/30164* (2013.01)

(58) Field of Classification Search
CPC ................... G06T 7/0008; G06T 7/11; G06T 2207/30164; G06N 3/0464; G06N 3/08; G06V 10/764; G06V 10/7715
See application file for complete search history.

(56) References Cited

U.S. PATENT DOCUMENTS

2004/0071347 A1 * 4/2004 Kaplan ................... G06T 7/215
382/217

* cited by examiner

*Primary Examiner* — Stephen R Koziol
*Assistant Examiner* — Michael Kim Maiden
(74) *Attorney, Agent, or Firm* — Jones Day

(57) ABSTRACT

An edge device performs automated visual inspection on a production line. A sequence of item images is received, and patch-level feature embeddings are extracted for each image. During live operation, a memory bank modeling normal behavior is built by computing distances between patch embeddings and existing entries and appending embeddings whose distance exceeds a dynamic add-threshold derived from a running mean and standard deviation of prior distances. For a candidate image, nearest-neighbor distances from its patches to the memory bank are computed and aggregated into an image-level anomaly score. A prediction threshold is calibrated by synthesizing defects from normal images, scoring both perturbation-augmented and normal images to obtain score distributions, and selecting a threshold that discriminates between them. The candidate image is classified as defective or normal by comparing its anomaly score to the calibrated threshold. All computation executes on the edge device without reliance on cloud resources during operation.

21 Claims, 3 Drawing Sheets

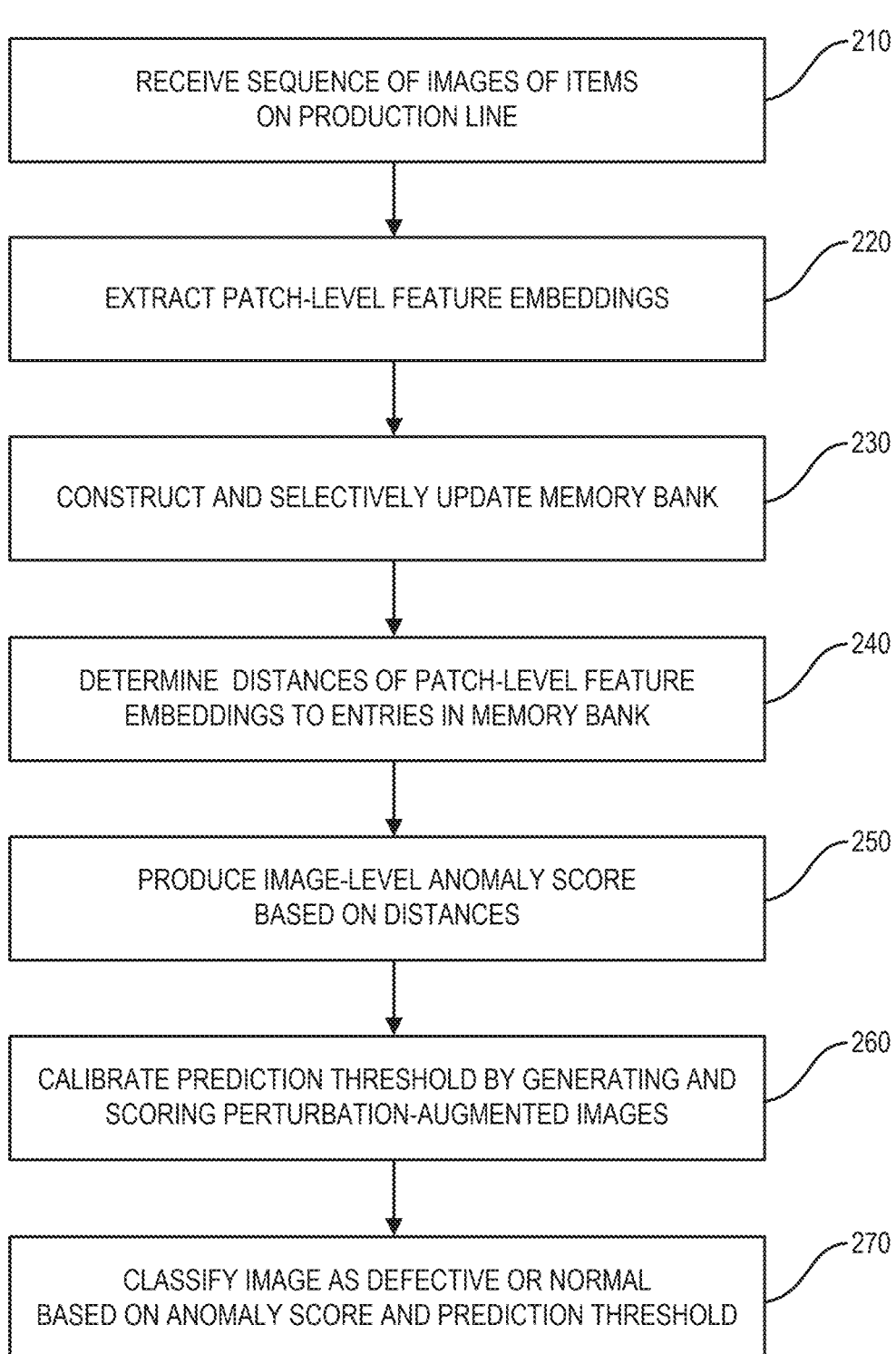

RECEIVE SEQUENCE OF IMAGES OF ITEMS
ON PRODUCTION LINE — 210

EXTRACT PATCH-LEVEL FEATURE EMBEDDINGS — 220

CONSTRUCT AND SELECTIVELY UPDATE MEMORY BANK — 230

DETERMINE DISTANCES OF PATCH-LEVEL FEATURE
EMBEDDINGS TO ENTRIES IN MEMORY BANK — 240

PRODUCE IMAGE-LEVEL ANOMALY SCORE
BASED ON DISTANCES — 250

CALIBRATE PREDICTION THRESHOLD BY GENERATING AND
SCORING PERTURBATION-AUGMENTED IMAGES — 260

CLASSIFY IMAGE AS DEFECTIVE OR NORMAL
BASED ON ANOMALY SCORE AND PREDICTION THRESHOLD — 270

FIG. 2

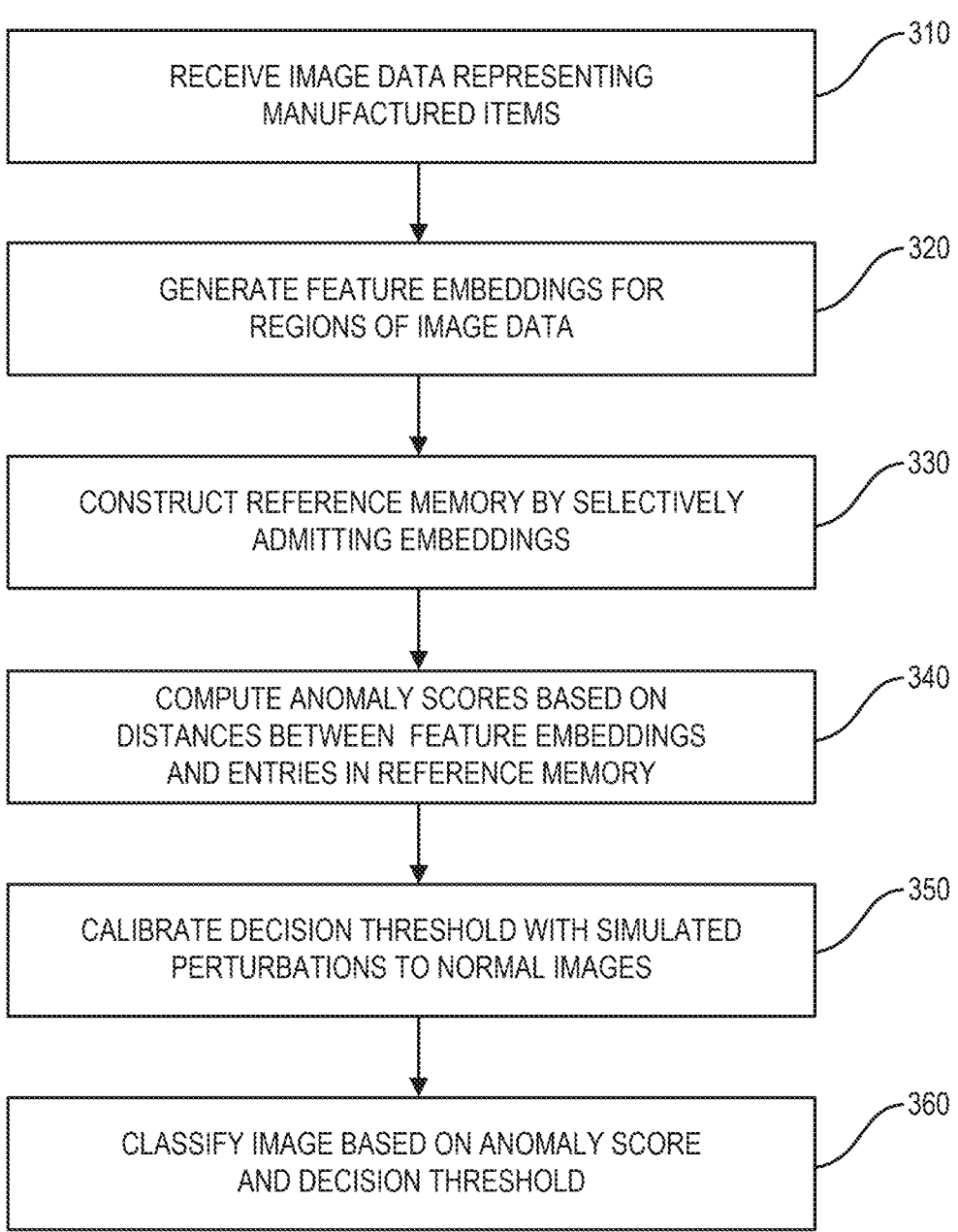

RECEIVE IMAGE DATA REPRESENTING
MANUFACTURED ITEMS — 310

GENERATE FEATURE EMBEDDINGS FOR
REGIONS OF IMAGE DATA — 320

CONSTRUCT REFERENCE MEMORY BY SELECTIVELY
ADMITTING EMBEDDINGS — 330

COMPUTE ANOMALY SCORES BASED ON
DISTANCES BETWEEN FEATURE EMBEDDINGS
AND ENTRIES IN REFERENCE MEMORY — 340

CALIBRATE DECISION THRESHOLD WITH SIMULATED
PERTURBATIONS TO NORMAL IMAGES — 350

CLASSIFY IMAGE BASED ON ANOMALY SCORE
AND DECISION THRESHOLD — 360

FIG. 3

SELF-LEARNING AI INSPECTION PLATFORM FOR ANOMALOUS OBJECT DETECTION

TECHNICAL FIELD

The subject matter described herein relates to advanced quality assurance techniques for more computationally efficiently and rapidly identifying anomalies in objects passing in front of one or more inspection camera modules such as on a production line.

BACKGROUND

Automated visual inspection is central to quality assurance in high-throughput manufacturing. Traditional machine learning approaches impose considerable operational friction: they require curated datasets of normal and defective samples, involve offline training cycles, and often depend on cloud resources that introduce latency and deployment complexity. Furthermore, these approaches can be brittle to process drift, recurring transient faults, and changing production conditions.

SUMMARY

An edge device performs automated visual inspection by ingesting a sequence of production-line images. It extracts patch-level feature embeddings. During live operation, it builds a memory bank of normal behavior by computing distances from each patch to existing entries and admitting a patch when its distance exceeds a dynamic add-threshold derived from running mean and standard deviation. For a given image, it computes nearest distances from its patches to the memory bank and aggregates those distances into an image-level anomaly score. It calibrates a prediction threshold using score distributions from normal and perturbation-augmented images and classifies the image as defective or normal by comparing its score to the calibrated threshold, all without reliance on cloud processing.

Data describing each classification can be provided to a downstream application or process. The dynamic add-threshold can be computed as $T_{add} = \mu + \alpha \cdot \sigma$, where $\mu$ is the running mean of patch-to-memory distances, $\sigma$ is the running standard deviation, and $\alpha$ is a tunable selectivity parameter that can be adaptively adjusted during memory-bank population based on an observed admission rate or a target coverage of normal variability. Memory-bank construction can initialize with a sentinel vector and use a greedy, online coreset-style selection that preferentially admits the farthest patch embeddings until a capacity limit is reached. Patch-level feature extraction can partition each image into a grid of patches and produce a D-dimensional embedding for each patch that maps back to its spatial location to enable defect localization. The distance measure can be Euclidean distance or cosine distance, and the image-level anomaly score can be the maximum of nearest-neighbor distances across all patch embeddings of the image.

A graphical user interface can generate and display a heatmap of anomaly intensity by mapping per-patch distances or scores to pixel coordinates for visual localization. Prediction-threshold calibration can generate simulated perturbations by cutting a randomly sized patch from a normal image, applying rotation, translation, color jitter, or pixel noise, and pasting the transformed patch at a different location in the image. Threshold selection can construct a receiver operating characteristic curve from scores of perturbation-augmented and normal images and choose a threshold that maximizes true positive rate while minimizing false positive rate. Training can use an ensemble built on temporally non-overlapping slices of the image stream, filtering training images for memory-bank population by retaining only images classified as normal by the ensemble; the ensemble can include at least three models, each independently building a memory bank from a distinct time slice to reduce the chance of normalizing a transient recurring defect.

Construction of the memory bank, threshold calibration, image-level scoring, and classification can be executed in real time on an edge accelerator. A trained state comprising the populated memory bank and the prediction threshold can be persisted to non-volatile storage and reloaded for later inspections. The approach can detect process drift by monitoring statistics of image-level anomaly scores over time and, upon detecting drift, trigger threshold recalibration and optionally reinitialize and repopulate the memory bank. For auditability, each inspected item can be logged with its image-level anomaly score, the classification decision, the threshold in effect, and identifiers of memory-bank entries used for nearest-neighbor matching. Memory-bank construction can perform exact or approximate nearest-neighbor search over a fixed-capacity index to maintain bounded latency, with capacity chosen to balance coverage of normal variability and real-time performance. Patch-embedding extraction can use a convolutional neural network or a transformer-based backbone configured to yield embeddings optimized for nearest-neighbor anomaly detection.

In another aspect, image data from camera modules is received at an edge device that includes processors and a hardware accelerator. A feature extractor partitions images into patches and produces patch embeddings. A memory-bank component realized as a fixed-capacity nearest-neighbor index is populated online using a dynamic add-threshold from running distance statistics. An inference component computes nearest-neighbor distances, aggregates them into an image-level anomaly score, and produces a defect-localization heatmap. A calibration component generates perturbation-augmented images, computes score distributions for normal and perturbation-augmented images, and selects a prediction threshold using ROC analysis. An ensemble-filtering component trains multiple models on non-overlapping time slices and retains only images for memory-bank training. A classifier compares the image-level score to the prediction threshold and outputs a pass/fail result, and a persistence component stores and reloads the memory bank and threshold. All training, calibration, and inference execute on the edge device in real time.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter adopts a streaming-first architecture that enables a quality assurance platform to learn from unlabeled live image streams, build a compact model of normal behavior, and execute immediate on-device anomaly detection and localization. By collapsing the traditional boundaries between data collection, training, calibration, and inference, the system empowers manufacturers to deploy robust, adaptive inspection in minutes rather than hours or weeks, all while upholding strict real-time guarantees and can, in some implementations, use fewer computing resources, including memory, compute, and/or I/O.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a first process flow diagram illustrating self-learning techniques for identification of anomalies in products using a quality assurance platform; and FIG. 3 is a second process flow diagram illustrating self-learning techniques for identification of anomalies in products using a quality assurance platform.

Like reference symbols in the various drawings indicate like elements.

DETAILED DESCRIPTION

Figure 1:
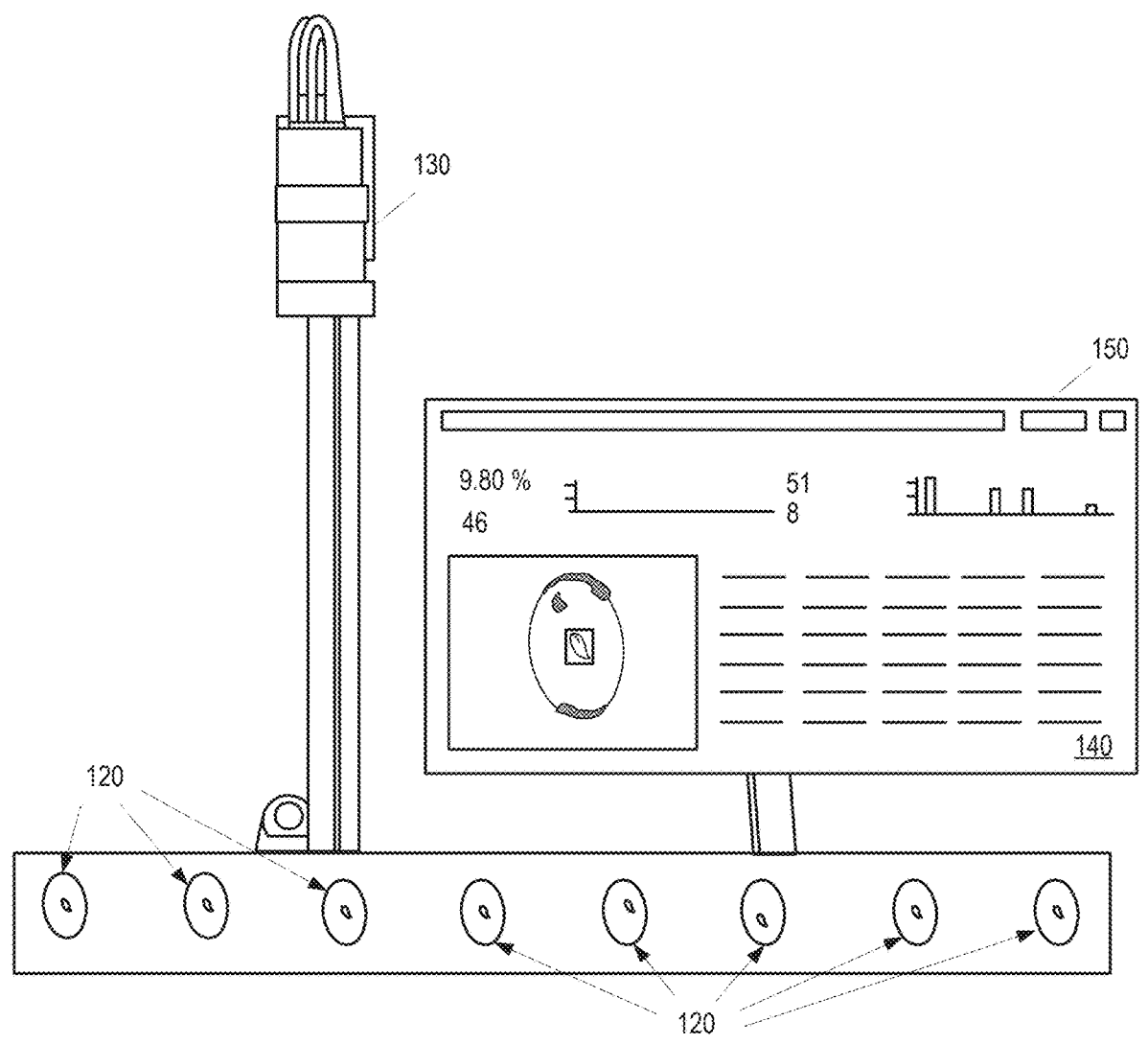
FIG. 1 is a diagram illustrating a production line quality assurance system.

The subject matter described herein is directed to automated detection of anomalies and other aberrations in images of physical objects, with particular relevance to quality assurance use cases such as production lines, inventorying, and broader supply chain inspections. The disclosed techniques integrate computer vision, machine learning, and complementary advanced methods across both hardware and software, with a unifying objective of making camera-based inspection systems intuitive to deploy and operate. In particular, the system spans image acquisition (e.g., cameras and illumination), on-device compute at the edge, and orchestration software for configuration and monitoring, thereby reducing setup time, operator burden, and change-over effort when new products or variants are introduced. Modern manufacturing requires visual inspection that learns rapidly, adapts continuously, and executes reliably at the edge under strict real-time constraints and variable environmental conditions. To that end, the system supports on-device decision-making to minimize bandwidth and latency, integrates with existing industrial control infrastructure, and provides immediate defect localization outputs to facilitate timely intervention and rework.

In response to these requirements, the disclosed AI inspection system infers the visual characteristics of "normal" operation directly from live production streams and surfaces defects within seconds. Departing from conventional machine-learning vision systems that depend on large-labeled datasets and offline training, the system performs data selection, model calibration, and inference in real time on edge devices. The AI inspection system employs a memory-bank-based anomaly detection framework, a greedy online coreset approximation to populate that memory efficiently, and automated threshold calibration using simulated perturbations. To prevent drift and the normalization of recurring faults, an ensemble-based filtering strategy isolates clean training data prior to deployment. Collectively, these techniques yield a self-starting, low-latency, and highly precise inspection pipeline purpose-built for industrial environments, with predictable resource usage across memory, compute, and I/O and tunable operating points that balance accuracy and throughput.

FIG. 1 depicts a diagram of an example production line 110 through which multiple objects 120 pass within the field of view of an inspection camera module 130. The inspection camera module 130 is positioned to capture one or more images of each object 120 as it traverses the field of view. The production line 110 can include a conveying mechanism, such as a belt, integrated into manufacturing and quality assurance operations and configured to ensure that each object 120 enters the field of view 140 of the inspection camera module 130. In an alternative configuration, the production line 110 can employ a camera-mounted module at a fixed location, with an operator manually presenting each product in lieu of an automated conveyor. An artificial intelligence (AI) inspection platform 140 comprises one or more computing devices and an electronic visual display 150. In typical deployments, the AI inspection platform 140 operates as an edge device co-located with the production line. It executes local inference using compact, lightweight models to deliver low-latency inspection and decisioning without relying on constant connectivity. When appropriate, the platform selectively communicates with cloud services to request additional, more computationally intensive analyses and to synchronize data. The AI inspection platform 140 can receive data directly from the inspection camera module 130 or remotely via an IoT connection to the connected inspection camera module 130, with connectivity established either peer-to-peer or through cloud servers.

The electronic visual display 150 renders one or more graphical user interfaces that visualize the objects 120 as they pass within the field of view 140, together with an overlay comprising complementary information generated by one or more image-analysis inspection tools. The combined visualization and overlay is referred to herein as a composite object image. The complementary information can include positional indicators, such as the locations of barcodes, text, features, or components; defect characterizations, such as the location, size, and severity of imperfections identified by the image-analysis tools; and variations in attributes of the objects, such as dimensions or coloring, that may affect quality assessments. This complementary information can be provided in an image-based format with red, green, blue, and alpha channels, enabling full-color overlays with optional transparency. Although FIG. 1 illustrates a single inspection camera module 130 paired with a local AI inspection platform 140, multiple inspection camera modules 130 can be deployed, and the graphical user interfaces can be rendered on various local or remote computing devices in real time, near real time, or on demand to review historical data. Historical data—including images and/or metadata associated with those images—can be stored locally on the AI inspection platform 140 and/or persisted in a cloud database.

The AI inspection platform 140 executes processes to characterize images captured by the inspection camera module 130. These processes can employ a range of computer vision and machine learning algorithms tailored to specific inspection tasks. In supervised settings, classification models (e.g., lightweight convolutional neural networks or compact vision transformers) can assign product type, grade, or condition labels, while object detection models can localize discrete components, fasteners, labels, or defects at the bounding-box level. For pixel-precise analysis, semantic and instance segmentation models can delineate surface regions, material boundaries, or defect extents to support dimensional measurements and defect sizing. Keypoint and pose-estimation models can verify alignment, orientation, or assembly fit by locating fiducials or critical landmarks. Text-centric modules, such as OCR and scene-text detection/recognition, can extract barcodes, lot codes, and printed markings for verification against expected values. Metric-learning and embedding-based models (e.g., Siamese/contrastive architectures) can perform similarity search, part verification, and variant matching across SKUs or revisions. Unsupervised or one-class anomaly detection can establish a notion of normality from in-distribution exemplars and flag deviations using memory-bank methods, teacher-student distillation, autoencoders, or diffusion-based reconstruction, providing heatmaps for localization. Traditional vision techniques (e.g., edge detection, color histogramming, morphology, template matching, and feature descriptors such as SIFT/ORB) can be fused with learned models to improve robustness and interpretability under constrained compute. Temporal models (e.g., tracking, optical flow, or lightweight video transformers) can exploit motion cues on moving conveyors to stabilize predictions, reduce false positives, and aggregate evidence across frames. Active learning and uncertainty estimation can prioritize samples for review to accelerate dataset curation. On the edge device, models can be optimized via quantization, pruning, knowledge distillation, and tiling/patching strategies to meet real-time latency and memory budgets, while the cloud can host more computationally intensive ensembles or high-resolution analyses when selectively invoked. Collectively, these algorithms determine attributes of the objects 120, including condition, type, size, orientation, completeness, and other relevant characteristics.

In some implementations, the AI inspection platform 140 leverages a memory-bank-based class of anomaly detection algorithms. The core components include a feature extractor that converts images into patch-level embeddings and a memory bank that maintains a prioritized subset of embeddings representative of normal operation. The platform's architecture emphasizes on-device computation for training, calibration, and inference, enabling efficient execution of local, lightweight models that meet stringent latency requirements. As needed, the platform can selectively offload to cloud services for additional, computationally expensive analyses, model evaluations, or retraining workflows. It can employ online, greedy coreset-style prioritization to populate the memory bank in real time; perform automatic prediction-threshold calibration using simulated perturbations generated from live normal images; apply ensemble-based filtering to prevent recurring defects from being incorporated into the definition of normality; and deliver real-time scoring, pass/fail decisions, and defect localization via heatmaps.

The AI inspection platform 140 can partition each incoming image into patches and computes a set of embeddings for those patches using a feature extractor. Let the image be divided into H×W patches of size P×P, yielding $N=HW/P^2$ embeddings. Each embedding $q \in R^D$ corresponds to a precise patch in the source image. This patch-wise representation supports two critical capabilities. First, anomaly scoring can be performed at the patch level, where anomalous patches manifest as large-distance outliers relative to the memory bank. Second, localization heatmaps (which can be visualized in a GUI of the AI inspection platform 150) can be generated by mapping per-patch anomaly scores back to pixel coordinates, enabling operators to visualize defects and accelerate root-cause analysis.

In contrast to memory bank methods which compute embeddings over a static dataset and perform a prioritization pass—often coreset sampling—to select a diverse set of normal embeddings, the AI inspection platform 170 can execute this prioritization online during live operation. Initialization can begin with a memory bank that contains a single zero-vector sentinel, and as images stream in, patch embeddings are compared against the current memory using a distance metric (e.g., Euclidean distance in embedding space, cosine distances, etc.). Distances computed during inference can be repurposed as an on-the-fly contribution score for diversity, so patches with the largest distance from the existing memory are the best candidates to expand coverage. A running mean μ and standard deviation σ of observed patch-to-memory distances define a dynamic add-threshold $T_{add}=\mu+\alpha\cdot\sigma$, where α is a configurable hyperparameter controlling selectivity, and only patches exceeding $T_{add}$ are admitted into the memory bank. Population proceeds until the memory bank reaches a predefined capacity, at which point the system has learned a compact representation of normal visual variability directly from the live process.

This real-time, greedy approximation captures the spirit of coreset sampling without requiring a full pass over a static dataset. It ensures the memory bank remains both diverse and bounded, enabling constant-time inference and predictable edge resource usage.

Given a new image, the system computes patch embeddings and, for each, finds the nearest neighbor distance to the memory bank. The guiding principle is that normal patches should lie close to the memory's manifold, while anomalous patches should deviate significantly. The final image-level anomaly score is taken as the maximum patch distance across the image. This conservative aggregation ensures that even a small localized defect can drive a high anomaly score, supporting high sensitivity in production.

To operationalize anomaly scores for line decisions, the system converts continuous scores into binary pass/fail outputs via a prediction threshold $T_{predict}$. This threshold is learned automatically, as described below.

Selecting a robust prediction threshold in production is non-trivial, particularly when labeled defect data are scarce. The system calibrates $T_{predict}$ using simulated perturbations generated from live normal images. Using the CutPaste method, the system cuts a randomly sized patch from a normal image, applies transformations such as rotation and pixel jitter, and pastes it into a new location, creating realistic perturbations that emulate irregularities without altering overall process dynamics. The system then processes both original normal images and their perturbed counterparts, producing two score distributions—normal and defective. The system selects $T_{predict}$ at the point on the ROC curve that maximizes the true positive rate while minimizing the false positive rate, yielding a principled decision boundary tuned to the production stream's visual statistics. This automated calibration aligns sensitivity and specificity with operational needs, and it adapts as the visual environment evolves.

Manufacturing lines can produce temporally correlated defects during transient faults. If such defects recur during the learning phase, a naive system might incorporate them into the memory as "normal." The system can mitigate this with ensemble filtering. The system can train an ensemble of N models on consecutive, non-overlapping time slices of the incoming stream, and each model constructs its own memory bank from its assigned slice. The ensemble then evaluates candidate images, and only those images classified as normal across all models are retained as clean data. The filtered, high-confidence normal images are finally used to initialize and train the production memory bank.

Because each ensemble member observes a distinct time slice, the probability that all members normalize the same transient defect is greatly reduced. This design helps maintain a clean definition of normality even in the face of periodic faults or short-lived process upsets.

All computations—memory bank population, threshold calibration, inference, and heatmap generation—run on the edge device, which eliminates cloud round-trips, reduces latency, and simplifies IT provisioning. A user can start an inspection and the system immediately begins populating its memory from the live camera stream using the online prioritization procedure. Once the memory bank hits capacity and $T_{predict}$ is calibrated, the system switches seamlessly to real-time pass/fail decisions and heatmap localization. The populated memory bank represents the trained model and is saved to disk for reuse, and if the process changes materially, an operator can reset the memory to restart learning from scratch.

The interface exposes three outputs per inspected item: a numerical anomaly score, a binary pass/fail decision, and a visual heatmap highlighting probable defects.

This architecture targets several operational characteristics. Patch-level inference and nearest-neighbor search against a bounded memory guarantee real-time performance on edge hardware. Learning from unlabeled live streams obviates large labeled datasets and reduces downtime. Ensemble filtering and periodic recalibration mitigate gradual shifts and transient defect patterns. Patch-level heatmaps provide localized defect evidence, improving trust and facilitating corrective action. Finally, the add-threshold parameter α, memory size, and calibration batch sizes can be tuned to balance sensitivity, specificity, and resource utilization.

In practice, careful selection of memory capacity and a yields strong coverage of normal variability without overfitting to noise. Calibration should leverage a representative slice of current production to ensure $T_{predict}$ reflects real conditions. If production modes change, operators can reinitialize the memory and recalibrate within the normal flow of work.

The system is designed to integrate with standard industrial cameras and edge compute modules. The feature extractor can be instantiated from modern vision backbones optimized for embedding quality and inference speed. The memory bank is implemented as a fixed-capacity structure supporting fast nearest-neighbor queries; approximate methods can be employed if memory grows, though the bounded capacity typically renders exact search tractable on embedded accelerators.

The system exposes standard interfaces for ingesting image streams, exporting scores and heatmaps, and persisting memory state. It can operate as a standalone inspection station or be embedded within broader MES/QMS ecosystems through lightweight adapters. Logging of anomaly scores, thresholds, and selected memory entries supports auditability and continuous improvement.

Having the AI inspection platform 150 operate entirely on the edge reduces data egress and exposure. No production imagery is required to leave the plant for training or inference. Access controls can be applied to model persistence artifacts, including memory banks and calibration records. When simulated perturbations are generated, the underlying normal images remain local, and only derived statistics are used to set thresholds.

FIG. 2 depicts a process flow for automated visual inspection of manufactured items. At 210, an edge computing device acquires a sequence of production-line images (e.g., from line-scan or area cameras) and performs optional preprocessing such as color space conversion, illumination normalization, geometric rectification, and per-image calibration. From these images, at 220, a feature extractor (e.g., a CNN or vision transformer backbone trained via self-supervised learning) derives a plurality of patch-level feature embeddings of fixed dimension; embeddings may be L2-normalized to enable cosine or Euclidean distance metrics and to improve numerical stability. At 230, a memory bank representative of normal operation is constructed by, for each patch-level embedding in the sequence, computing its distance to one or more entries in the memory bank (e.g., k-nearest neighbors with k≥1) and selectively adding the embedding when the minimum distance exceeds a dynamic add-threshold $T_{add}$ computed from a running mean u and running standard deviation σ of previously observed distances (e.g., $T_{add}=\mu+\lambda\cdot\sigma$ with λ being a tunable hyperparameter) For a given image, at 240, distances from its patch-level embeddings to their nearest memory entries are computed, optionally using approximate nearest-neighbor search for real-time latency. At 250, these distances are aggregated into an image-level anomaly score using a robust reduction (e.g., maximum, top-p percentile, or a spatially weighted pooling that emphasizes contiguous high-distance regions), and a patch-level anomaly map can be retained for localization. At 260, a prediction threshold is calibrated by generating simulated perturbations from normal images (e.g., cut-and-paste, Poisson blending, texture replacement, or inpainting artifacts) to result in perturbation-augmented images, scoring the perturbation-augmented images and corresponding normal images to obtain respective score distributions, and selecting a threshold that discriminates between them (e.g., maximizing Youden's J or meeting a target false-alarm rate). Finally, at 270, the given image is classified as defective or normal by comparing its image-level anomaly score to the prediction threshold. In some variations, all operations are executed on the edge device without reliance on cloud processing, batching, and hardware-accelerated k-NN used to meet real-time throughput and power constraints. Complementing this overview, FIG. 3 details a closely related embodiment that follows the same pipeline while highlighting implementation considerations at the frame and patch levels.

FIG. 3 depicts a complementary embodiment that aligns with the FIG. 2 pipeline. At 310, image data representing manufactured items is received, optionally with time stamps, camera identifiers, and line-speed metadata for synchronization. Thereafter, at 320, patch-level feature embeddings are generated over a fixed-stride grid or proposal-based tiling using a shared backbone; embeddings may be L2-normalized to support cosine or Euclidean distance metrics and to stabilize similarity computations. During operation of a manufacturing line, at 330, a memory bank is constructed as an exemplar set of normal behavior by, for each candidate embedding, computing its distance to one or more entries in the memory bank (e.g., k-nearest neighbors with k≥1) and selectively admitting the embedding when the minimum distance exceeds an adaptive admission threshold $T_{add}$ derived from a running mean u and standard deviation σ of historical distances (e.g., $T_{add}=\mu+\lambda\cdot\sigma$). For a target image, at 340, anomaly scores are computed by comparing each of its embeddings to the memory bank (e.g., nearest-neighbor distance, cosine dissimilarity, or Mahalanobis distance under a local covariance model), producing a patch-level anomaly map; an image-level anomaly score is then derived by a robust aggregation such as maximum, top-p percentile pooling, or spatially weighted pooling that emphasizes contiguous high-score regions. A prediction threshold is calibrated, at 350, by forming empirical score distributions from images with simulated perturbations and from corresponding normal images, and selecting a threshold that meets a specified operating criterion (e.g., target false-alarm rate, maximized Youden index, or cost-sensitive risk). The target image is then classified, at 360, by comparing the image-level anomaly score to the prediction threshold, optionally with temporal smoothing or hysteresis across frames to reduce decision flicker.

The subject matter can be deployed across edge devices, on-premises servers, and cloud or hybrid environments. Instead of a single shared system bus, platforms can typically use high-speed, point-to-point interconnects and fabrics (for example, Peripheral Component Interconnect Express (PCI Express), NVLink high-speed interconnects, and other coherent links) to connect accelerators, storage, and network interfaces with low latency and high bandwidth. A heterogeneous processing subsystem can pair general-purpose central processing units (CPUs) with specialized accelerators such as graphics processing units (GPUs), neural processing units (NPUs), tensor processing units (TPUs), or field-programmable gate arrays (FPGAs) to execute compute- and inference-intensive workloads. Non-transitory processor-readable memory can be organized in tiers, including on-package caches, high-bandwidth memory (HBM), double data rate (DDR) system memory, and local Non-Volatile Memory express (NVMe) solid-state storage. Program instructions and model artifacts can be persisted on Non-Volatile Memory express (NVMe) solid-state drives (SSDs), network-attached storage, or cloud object stores, and executed on one or more processing units within a single node or across a distributed cluster.

Storage and input/output (I/O) can be managed by dedicated controllers and drivers that interface with local Non-Volatile Memory express (NVMe) devices, networked block or file systems, and object storage services. Systems can expose one or more network interfaces to provide secure, high-throughput connectivity to external devices and services over Ethernet, wireless fidelity (Wi-Fi), fifth-generation (5G) cellular networks, or other transports. These interfaces can support device management, telemetry, distributed training or inference, and integration with enterprise systems. Where interactive use is required, displays (for example, liquid crystal display (LCD), organic light-emitting diode (OLED), or embedded panels) and human-interface peripherals such as keyboards, pointing devices, touchscreens, or voice interfaces can route input and output through the display and input subsystems. Headless deployments—common for servers and edge gateways—can omit local displays and peripherals and can be administered remotely through secure management channels and standardized application programming interfaces (APIs).

The subject matter can be realized in digital electronic circuitry and integrated hardware, including application-specific integrated circuits (ASICs), field-programmable gate arrays (FPGAs), and heterogeneous compute modules, as well as in firmware and software. Implementations can be packaged as one or more services or applications executing on programmable systems that receive data and instructions from, and transmit data and instructions to, local or remote storage and input/output (I/O) devices. Deployments may follow client-server, service-mesh, or microservices patterns and can run on bare metal, within virtual machines, or in containers orchestrated by cluster schedulers. Components can be geographically distributed yet logically unified through secure communication over private networks or the public internet.

Software can be authored in high-level procedural, object-oriented, functional, logical, or systems programming languages and compiled to native machine code or executed within managed runtimes. As used here, a non-transitory computer-readable medium can be any physical medium that stores instructions or data for execution by a programmable processor, including solid-state memory, magnetic storage, optical media, or programmable logic devices. Transient storage, such as processor caches and volatile system memory, can hold instructions and data during execution to meet real-time and low-latency constraints. Instructions and data may also be delivered as signals over wired or wireless links among nodes participating in a distributed computation, subject to appropriate security, integrity, and reliability guarantees.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims, is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for automated visual inspection of manufactured items, comprising:

receiving, at an edge computing device, a sequence of images representing items on a production line;

extracting, for each image, a plurality of patch-level feature embeddings using a feature extractor;

constructing, during live operation, a memory bank representative of normal operation by, for each patch-level feature embedding of the sequence, computing a distance to one or more entries of the memory bank and selectively adding the patch-level feature embedding to the memory bank when the distance exceeds a dynamic add-threshold determined from a running mean and a running standard deviation of previously observed distances;

determining, for a given image, a set of distances from its patch-level feature embeddings to nearest entries of the memory bank;

producing an image-level anomaly score based on an aggregation of the set of distances;

calibrating a prediction threshold by generating simulated perturbations from normal images to result in perturbation-augmented images, scoring the perturbation-augmented images and corresponding normal images to obtain respective score distributions, and selecting the prediction threshold to discriminate between the score distributions; and classifying the given image as defective or normal by comparing the image-level anomaly score to the prediction threshold, wherein all steps are performed on the edge computing device without reliance on cloud processing during operation.

2. The method of claim 1 further comprising:

providing data characterizing the classification of the images to a consuming application or process.

3. The method of claim 1, wherein the dynamic add-threshold is computed as $T_{add} = \mu + \alpha \cdot \sigma$, where $\mu$ is the running mean of observed patch-to-memory distances, $\sigma$ is the running standard deviation, and $\alpha$ is a tunable selectivity parameter.

4. The method of claim 3, wherein $\alpha$ is adaptively adjusted during memory bank population based on an observed admission rate or a target coverage metric of normal variability.

5. The method of claim 1, wherein constructing the memory bank further comprises initializing the memory bank with a sentinel vector and performing a greedy, online coreset-style selection in which patch-level feature embeddings having greatest distances to the memory bank are preferentially admitted until a predefined capacity is reached.

6. The method of claim 1, wherein extracting the patch-level feature embeddings comprises partitioning each image into a grid of patches and generating, for each patch, a D-dimensional embedding that is mappable back to a corresponding spatial location in the image for defect localization.

7. The method of claim 1, wherein the distance is a Euclidean distance or a cosine distance computed between a patch-level feature embedding and entries in the memory bank.

8. The method of claim 1, wherein producing the image-level anomaly score comprises selecting a maximum of the nearest-neighbor distances across all patch-level feature embeddings of the given image.

9. The method of claim 1, further comprising generating and visualizing, in a graphical user interface, a heatmap of anomaly intensity by mapping per-patch distances or anomaly scores back to pixel coordinates of the given image for visual localization of defects.

10. The method of claim 1, wherein calibrating the prediction threshold comprises generating simulated perturbations by cutting a randomly sized patch from a normal image, applying at least one transformation selected from rotation, translation, color jitter, and pixel noise, and pasting the transformed patch into a different location within the image.

11. The method of claim 10, wherein selecting the prediction threshold comprises constructing a receiver operating characteristic (ROC) curve from scores of the perturbation-augmented images and scores of the normal images and choosing a threshold that maximizes a true positive rate while minimizing a false positive rate.

12. The method of claim 1, further comprising training an ensemble of models on temporally non-overlapping slices of the image stream and filtering training images for memory bank population by retaining only images classified as normal by the ensemble.

13. The method of claim 12, wherein the ensemble comprises at least three models each independently constructing a respective memory bank from a distinct time slice, thereby reducing a likelihood of normalizing a transient recurring defect.

14. The method of claim 1, wherein constructing the memory bank, calibrating the prediction threshold, producing image-level anomaly scores, and classifying images are executed in real time on an edge accelerator.

15. The method of claim 1, further comprising persisting a trained model state comprising the populated memory bank and the prediction threshold to non-volatile storage, and reloading the trained model state for subsequent inspections.

16. The method of claim 1, further comprising detecting process drift by monitoring statistics of image-level anomaly scores over time and, responsive to detecting drift, triggering recalibration of the prediction threshold and, optionally, reinitialization and repopulation of the memory bank.

17. The method of claim 1, further comprising logging, for each inspected item, the image-level anomaly score, the classification decision, the prediction threshold in effect, and identifiers of memory bank entries used for nearest-neighbor matching to support auditability.

18. The method of claim 1, wherein constructing the memory bank further comprises performing exact or approximate nearest-neighbor search over a fixed-capacity index to maintain bounded latency, the fixed capacity being selected to balance coverage of normal variability and real-time performance.

19. The method of claim 1, wherein extracting the patch-level feature embeddings employs a convolutional neural network or a transformer-based backbone configured to yield embeddings optimized for nearest-neighbor anomaly detection.

20. A computer-implemented method for automated visual inspection comprising:

receiving image data representing manufactured items;

generating feature embeddings for respective regions of the image data;

constructing, during operation, a reference memory by selectively admitting embeddings based on a measure of dissimilarity relative to entries in the reference memory;

for a target image, computing anomaly scores from comparisons between its embeddings and the reference memory and deriving an image-level anomaly score from the anomaly scores;

calibrating a decision threshold using scores from images with defects that have random noise introduced in them and scores from corresponding normal images; and classifying the target image by comparing the image-level anomaly score to the decision threshold.

21. A system for automated visual inspection comprising:

one or more inspection cameras modules configured to provide an image stream of manufactured items;

an edge computing device comprising one or more processors and a hardware accelerator;

a feature extraction unit configured to partition each image into patches and generate patch-level embeddings;

a memory bank unit implemented as a fixed-capacity nearest-neighbor index and configured to be populated online during live operation using a dynamic add-threshold derived from running statistics of patch-to-memory distances;

an inference unit configured to compute nearest-neighbor distances for patch-level embeddings, to aggregate the distances into an image-level anomaly score, and to generate a defect localization heatmap;

a calibration unit configured to generate perturbation-augmented images from normal images, to compute score distributions for normal and perturbation-augmented images, and to select a prediction threshold using ROC analysis;

an ensemble filtering unit configured to train a plurality of models on temporally non-overlapping slices of the image stream and to retain only normal images for memory bank training;

a classification unit configured to compare the image-level anomaly score to the prediction threshold and output a pass/fail result; and a persistence unit configured to store and reload the memory bank and prediction threshold;

wherein the system executes all training, calibration, and inference processes on the edge computing device in real time.

\* \* \* \* \*